US005274200A

United States Patent [19]

Das et al.

[11] Patent Number: 5,274,200

[45] Date of Patent: Dec. 28, 1993

[54] SOUND ATTENUATING ENCLOSURE FOR COMPRESSORS

[75] Inventors: Sathish R. Das; Dale R. Bennett, both of Indianapolis, Ind.

[73] Assignee: Carrier Corporation, Syracuse, N.Y.

[21] Appl. No.: 995,062

[22] Filed: Dec. 22, 1992

[51] Int. Cl.[5] ............ H02K 5/24

[52] U.S. Cl. ............ 181/202; 415/119; 62/259.1; 62/296

[58] Field of Search ............ 181/200, 201, 202, 204, 181/229, 403, 198; 415/108, 119; 62/159.1, 296

[56] References Cited

U.S. PATENT DOCUMENTS 3,881,569 5/1975 Evans, Jr. ............ 181/202
4,926,963 5/1990 Snyder ............ 62/296
4,956,978 9/1990 Bleck et al. ............ 62/296 X
4,991,406 2/1991 Fuji et al. ............ 62/296
5,121,810 6/1992 Araki ............ 181/198
5,151,018 9/1992 Clendenin et al. ............ 62/296 X

*Primary Examiner*—Michael L. Gellner
*Assistant Examiner*—Khanh Dang

[57] ABSTRACT

A sound attenuating enclosure with sound absorbing panels. The panels are positioned in an array of four side panels and a top panel. The array of panels is covered with vinyl material forming seams between adjoining panels and flaps for securing the panels together to form the enclosure. Each of the panels is provided with a pouch having a resealable opening for containing a flat sound reflecting element. One predetermined side panel is provided with apertures for allowing supply lines to pass through the enclosure.

11 Claims, 3 Drawing Sheets

SOUND ATTENUATING ENCLOSURE FOR COMPRESSORS

BACKGROUND OF THE INVENTION

This invention relates to the field of sound attenuation, and more particularly to a sound attenuating enclosure that can be placed around the compressor of an air conditioner to reduce compressor noise.

Typical residential and commercial air conditioners employ compressors to circulate any one of a variety of refrigerants through the refrigeration cycle. The basic components of such an air conditioner would include the compressor, a condensing coil, and fan for blowing air from the condensing coil in a desired direction, and typically copper pipe for circulating the liquid or gaseous refrigerants through the compressor and condenser. The components can be contained within a single housing or placed at any distance from one another while remaining connected in a closed system manner. Due to design or space limitations, the compressor is frequently placed at a location distant from the other components and is often times not provided with any type of housing. Separate placement of the compressor is desirable because among the air conditioner components, the compressor produces the greatest amount of noise and may require placement at a location exterior to the space being cooled. Even when the compressor is placed at a distant location, noise produced by its operation may still prove to be a nuisance to any persons within hearing range of the compressor.

OBJECTS AND SUMMARY OF THE INVENTION

It is therefore an object of the present invention to provide a sound attenuating enclosure for a compressor that is easily manufactured and installed around a compressor.

A further object of the present invention is to provide a sound attenuating enclosure for a compressor that includes sound absorbing panels encapsulated in a flexible covering allowing assembly by folding the panels together around the compressor to form the enclosure.

It is another object of the present invention to provide a sound attenuating enclosure for a compressor that includes a flexible covering having resealable cells for optionally containing flat sound reflecting elements to reflect noise back toward the interior of the enclosures.

These and other and further objects are accomplished in one particular embodiment of the present invention by providing an array of five rectangularly shaped sound absorbing panels that are encapsulated in a flexible vinyl covering material. The panels are positioned in the array so they can be folded together around a compressor to form the enclosure. A stand-alone compressor would typically have supply lines connecting it to other components. To accommodate these supply lines so they pass through the enclosure without having to be cut or otherwise disturbed, apertures having slots wide enough to allow the lines to pass along the slots during assembly are provided in one of the five panels. Slits through the vinyl covering are provided above the slots and apertures.

The vinyl covering is provided with seams between the edges of adjoining panels and is extended over the outer edges of the array to form flap segments. To assemble the enclosure around the compressor, the panel having the slots is positioned next to the supply lines and moved over the lines so the lines come to rest in the apertures. The remaining panels are then folded around the compressor by a hinging action about the seams between the panels to form an enclosure having four side panels and a top panel. The flap segments around the top panel are secured to side panels by hook and loop tape. In a similar manner, the vertical edge of the side panel accommodating the supply lines of the compressor is secured to its adjacent panel.

Each of the panels is provided with a resealable cell for receiving a flat sound reflecting element. These elements may be inserted and sealed within any number of the five cells to further supplement the sound attenuating quality of enclosure.

BRIEF DESCRIPTION OF THE DRAWINGS

Further objects of the present invention together with additional features contributing thereto and advantages accruing therefrom will be apparent from the following description of the preferred embodiment shown in the drawings wherein.

DETAILED DESCRIPTION OF THE PREFERRED EMBODIMENT

Figures 1, 2, 3:
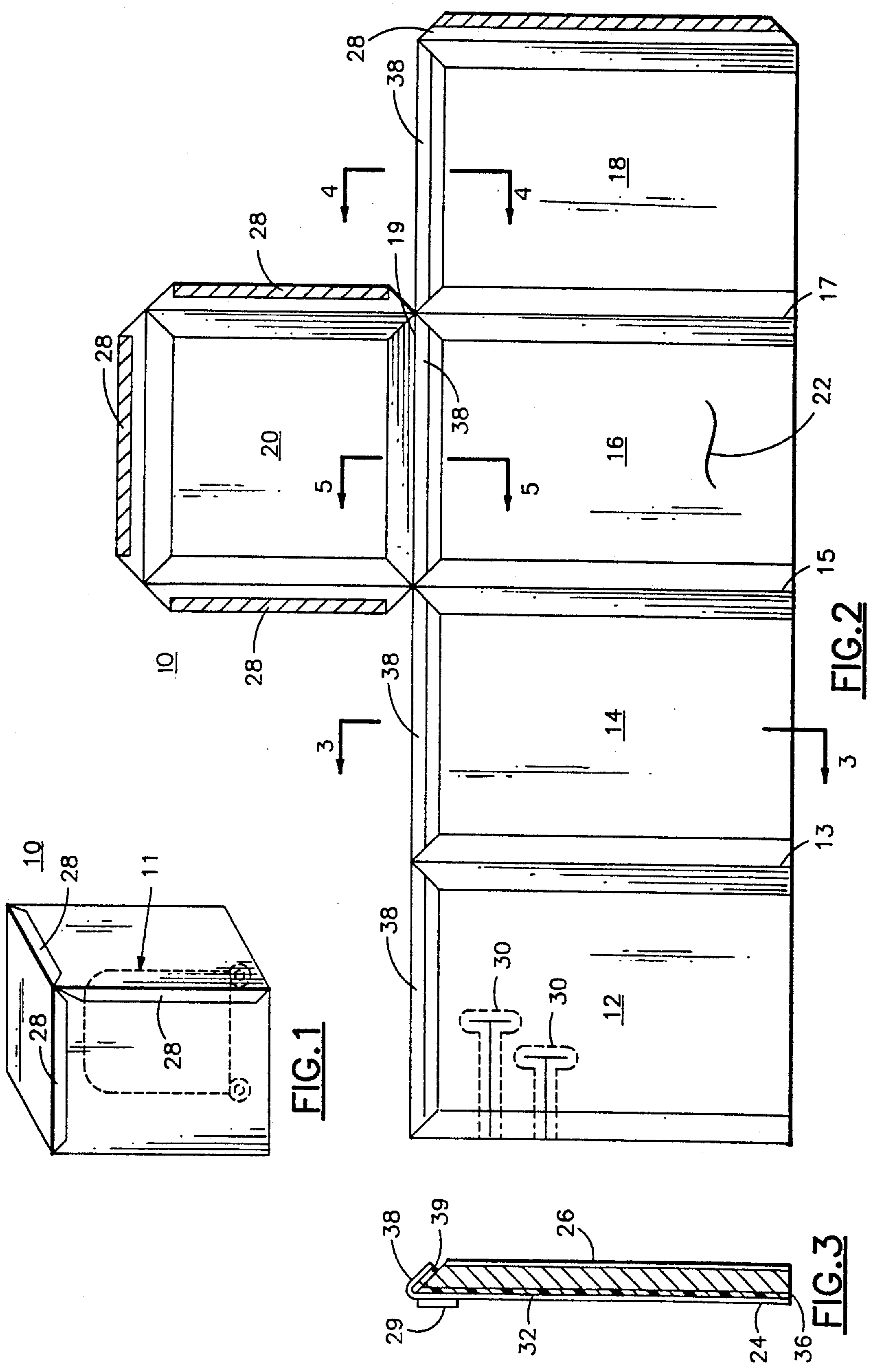
FIG. 1 is a perspective view of the preferred embodiment of the sound attenuating enclosure of the present invention.
FIG. 2 is a plan view of the sound attenuating enclosure of the present invention shown unfolded prior to assembly.
FIG. 3 is a cross-sectional view taken along line 3—3 of FIG. 2.

Referring now to FIG. 1 there is shown a sound attenuating enclosure 10 according to the present invention. Drawn in phantom, for purposes of illustration only, a compressor 11 is shown within the enclosure 10. Such a compressor would typically be bolted to a unit basepan. Although shown in conjunction with the compressor 11, the enclosure 10 of the present invention may be readily adapted to attenuate the noise produced by any one of a variety of mechanical sources of noise.

The enclosure 10 is shown in FIG. 2 in an unfolded condition prior to assembly around a source of noise. In accordance with one preferred embodiment of the enclosure 10, FIG. 2 shows five rectangular sound absorbing panels, four side panels 12, 14, 16, 18, and a square top panel 20. The five panels, as shown in FIG. 2, are positioned in an array which is covered on both sides by a flexible vinyl sheet 22. A cross-section of panel 14 is shown in FIG. 3 and is representative of panels 12, 16, 18 and 20. As shown in detail in FIG. 3 each of the panels has an exterior surface 24 and an interior surface 26, thus defining exterior and interior surfaces for the array of panels and for the enclosure 10. Each panel of the preferred embodiment is semi-rigid and constructed of fiberglass. The four edges of top panel 20 are bevelled at approximately forty-five degrees toward the interior surface of the panel making the exterior surface of panel 20 slightly larger than its interior surface. The side panels 12, 14, 16 and 18 are similarly bevelled on the top and vertical edges. The bevelled edges allow the array to be folded together around the source of noise without the edges of the panels binding against each other to prevent proper assembly of the enclosure.

Referring again to FIG. 2 wherein seams 13, 15 and 17 are shown formed between the adjoining edges of the side panels in the array. In the preferred embodiment, these seams are formed by a heat seal, sealing together the vinyl covering the exterior and interior surfaces of the array. A seam 19 is positioned between top panel 20 and side panel 16. As shown in detail in FIG. 5, the seam 19 is formed by the vinyl covering the exterior surfaces of top panel 20 and side panel 16 and a flap segment 38. Upon assembly, the panels hinge against each other along the seams and then fold together to form the enclosure 10. The vinyl covering the array of panels is extended over the edges of top panel 20 and the side panels to form flap segments 28 and 38 as shown in FIG. 2. Hook and loop tape material well known in the art is used to secure flap segments 28 to adjacent panels to complete assembly of enclosure 10. One length of either the hook or loop tape is secured to the flap segments 28 while a corresponding length of tape 29 is secured to the top of the exterior surfaces of side panels 12, 14 and 18 as shown on panel 14 in FIG. 1. Similarly, a corresponding vertical length of hook or loop tape (not shown) is secured along the exterior surface of panel 12 so that flap segment 28 of side panel 18 may be secured to panel 12.

Side panel 12 of the array is provided with two apertures 30 formed by circular holes and slots cut through the panel from the outer edge to the holes. The vinyl covering both sides of the apertures 30 is slit so that the apertures remain substantially covered by the vinyl. The apertures 30 are provided to allow any supply lines such as copper pipe or electrical conduit to pass through the enclosure with a minimum loss of sound absorbing quality to the panel. The apertures may vary in number and location depending upon the particular mechanical device to be enclosed.

To assemble the enclosure, panel 12 is positioned adjacent the supply lines and then moved over the lines so that they come to rest in the circular holes of apertures 30. The panels 14, 16 and 18 are then wrapped around the compressor while top panel 20 is held in a vertical position out of the way of the assembly of the side panels. Flap segment 28 of side panel 18 is then secured to the exterior surface of side panel 12 by the hook and loop tape as described above. After assembly of the side panels, top panel 20 is hinged down to the horizontal position shown in FIG. 1. Assembly is then completed by securing the flap segments 28 of top panel 20 to the top of the exterior surfaces of the side panels as described above. In this manner, the noise producing compressor 11 is completely surrounded by the enclosure 10.

Figure 4:
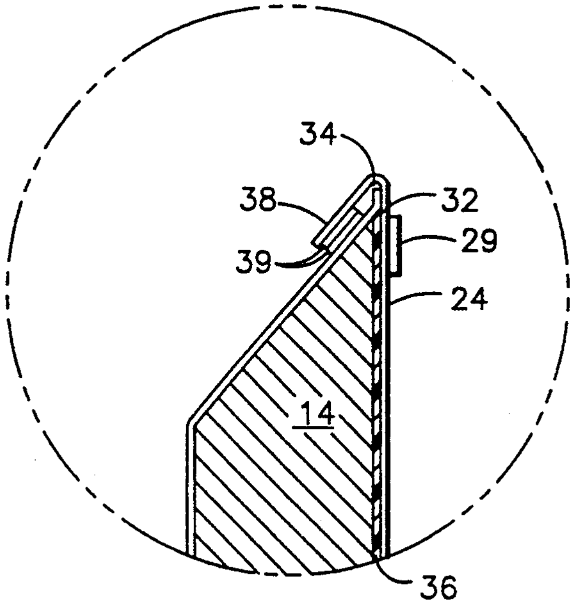
FIG. 4 is an enlarged detailed taken along section 4—4 of FIG. 2.
Figure 5:
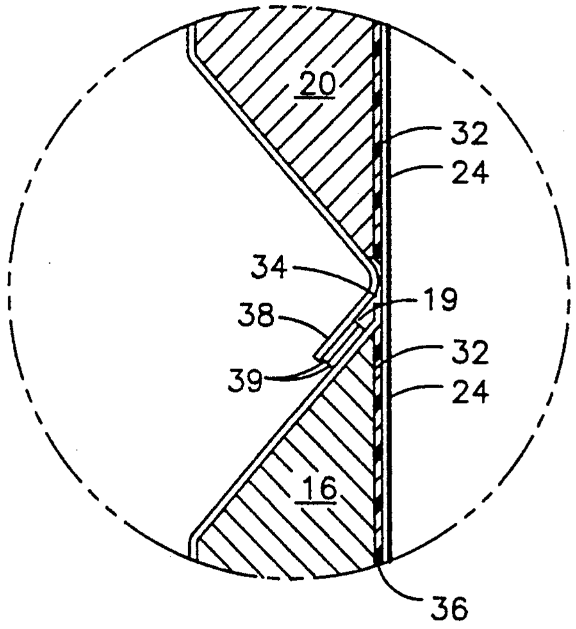
FIG. 5 is an enlarged detailed view taken along section 5—5 of FIG. 2.

As shown in FIGS. 3, 4, and 5, each of the panels contains a pouch or cell 32 formed between the exterior surface 24 of the panel and the vinyl material covering the surface 24. Each of the cells 20 has a resealable opening 34. The cell openings 34 are sealed by flap segments 38 by use of conventional hook and loop tape 39 secured to the flap segments 38 and the vinyl material covering the bevelled edges of the panels as shown in detail in FIGS. 4 and 5. The cell openings 34 may alternatively be sealed by molded interlocking channels well known in the art that would be provided in place of the hook and loop fastening tape 39. Each of the cells 32 may optionally accommodate a flat sound reflecting insert 36. The sound reflecting inserts 36 provide additional sound attenuation for the enclosure 10 by reflecting sound passing through the panel back toward the source of noise. Depending upon the level of noise produced by the mechanical source, any number of the cells 32 may be provided with an insert 36. The inserts 36 are sealed within the cells 32 by flap segments 38 as shown in FIGS. 4 and 5. The insert 36 for the cell on side panel 12 is provided with apertures corresponding in size and placement to the apertures 30 in panel 12.

The sound absorbing panels are preferably made of fiberglass, but may be composed of any variety of materials suitable for sound absorption or composites of such materials. The sound reflecting inserts 36 are preferably made of semi-rigid plastic materials such as PVC, EVA or polycarbonate plastics which, because of their density and smooth surface, provide excellent sound reflecting qualities.

Figure 6:
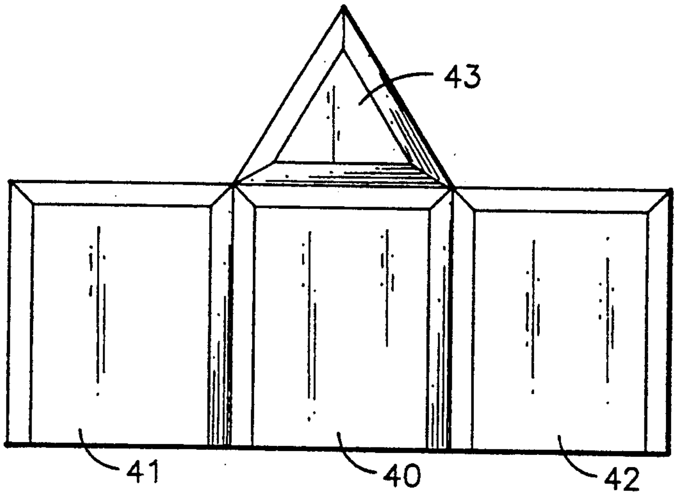
FIG. 6 is a schematic view of a first alternate preferred embodiment of the present invention.
Figure 7:
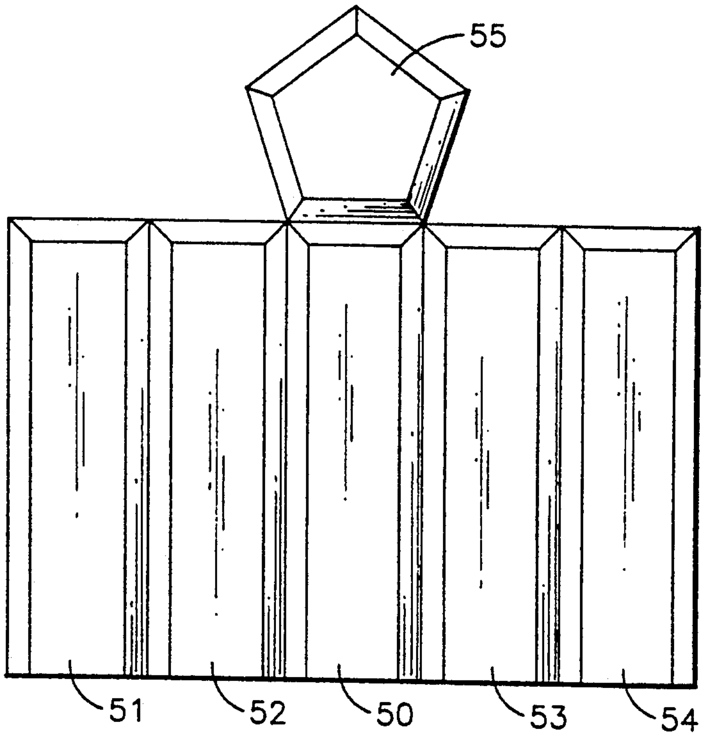
FIG. 7 is a schematic view of a second alternate preferred embodiment of the present invention.

As would be apparent to one of skill in the art, the sound attenuating enclosure of the present invention need not necessarily consist of five panels. The inventive enclosure may contain a minimum of four panels including three rectangular side panels 40, 41, and 42 and a triangular top panel 43, as shown in schematic in FIG. 6. Depending on the size and shape of the mechanical device to be enclosed, any number of panels in excess of five may be used to practice the present invention. FIG. 7 shows in schematic one such embodiment having six panels including five rectangular side panels 50–54 and a pentagon-shaped top panel 55.

While this invention has been explained with reference to the structure disclosed herein, it is not confined to the details set forth and this application is intended to cover any modifications and changes as may come within the scope of the following claims.

What is claimed is:

1. A sound containment enclosure for attenuating a wide range of noise frequencies produced by a mechanical source of noise, the enclosure comprising:

an array of a plurality of sound absorbing panels, each of said panels having an exterior surface and an interior surface and bevelled edges formed between the surfaces sloping away from said interior surface;

flexible sheet material covering the exterior and interior surfaces of the array of panels thereby forming seams between adjoining panel edges and extending flap segments along the outer edges of the panels, said seams allowing said panels to be positioned in different planes by hinging action so that the array of panels can be assembled to form an enclosure having a top panel and side panels;

means for fastening said extending flap segments to adjacent panel surfaces to complete assembly of the enclosure to surround the source of noise so that noise produced thereby is absorbed by the sound absorbing panels; and cells formed between said flexible sheet material and the exterior surface of each of said plurality of sound absorbing panels, each cell having a resealable opening formed in the sheet material for receiving a flat sound reflecting element.

2. The sound containment enclosure according to claim 1 further including at least one flat sound reflecting element corresponding in size and shape to one of said plurality of sound absorbing panels, capable of being inserted through the cell opening and removably sealed in the cell provided on said one panel so that noise passing through the panel is reflected back toward the source of noise by said flat sound reflecting element.

3. The sound containment enclosure according to claim 1 wherein a predetermined one of said plurality of sound absorbing panels includes aperture means formed therein for allowing supply lines connected to the mechanical source of noise to pass through the enclosure.

4. The sound containment enclosure according to claim 3 wherein said array of said plurality of sound absorbing panels includes at least four of said panels, the top panel being triangular in shape and the side panels being rectangular in shape.

5. The sound containment enclosure according to claim 3 wherein said array of said plurality of sound absorbing panels includes five of said panels, each of said panels being rectangular in shape.

6. The sound containment enclosure according to claim 5 wherein each of said five panels is formed from fiberglass.

7. The sound containment enclosure according to claim 6 including at least one flat sound reflecting element corresponding in size and shape to one of said five panels, capable of being inserted through the cell opening and sealed in the cell provided on said one panel so that noise passing through the panel is reflected back toward the source of noise by said flat sound reflecting element.

8. The sound containment enclosure according to claim 7 including five of said flat sound reflecting elements, each being sealed within one of the cells provided on the panels.

9. The sound containment enclosure according to claim 1 wherein said means for fastening said extending flap segments to adjacent panels includes hook and loop material secured to the flap segments and a corresponding portion of the flexible sheet material covering the surface of the panels.

10. The sound containment enclosure according to claim 1 wherein said cells are sealed by hook and loop material secured to the opening of the cells formed by said flexible sheet material.

11. The sound containment enclosure according to claim 1 wherein said cells are sealed by interlocking channels provided on the opening of the cells formed by said flexible sheet material.

* * * * *